(12) United States Patent
Endo

(10) Patent No.: US 9,734,604 B2
(45) Date of Patent: Aug. 15, 2017

(54) GRAPHIC DISPLAY CONTROL DEVICE, GRAPHIC DISPLAY CONTROL METHOD, AND STORAGE MEDIUM HAVING STORED THEREIN GRAPHIC DISPLAY CONTROL PROGRAM

(71) Applicant: CASIO COMPUTER CO., LTD., Shibuya-ku, Tokyo (JP)

(72) Inventor: Kota Endo, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/004,536

(22) Filed: Jan. 22, 2016

(65) Prior Publication Data

US 2016/0267691 A1 Sep. 15, 2016

(30) Foreign Application Priority Data

Mar. 12, 2015 (JP) ................................. 2015-048961

(51) Int. Cl.
*G06T 11/20* (2006.01)
*G06F 3/0484* (2013.01)
*G06F 3/0488* (2013.01)

(52) U.S. Cl.
CPC .......... *G06T 11/203* (2013.01); *G06F 3/0488* (2013.01); *G06F 3/04847* (2013.01)

(58) Field of Classification Search
CPC ... G06T 11/203; G06F 3/0488; G06F 3/04847
See application file for complete search history.

(56) References Cited

U.S. PATENT DOCUMENTS

| 2002/0051004 A1* | 5/2002 | Trika | G06T 11/203 345/619 |
| 2009/0115782 A1* | 5/2009 | Irons | G06T 19/20 345/420 |
| 2013/0132875 A1* | 5/2013 | Allen | G06F 8/34 715/765 |
| 2014/0317570 A1 | 10/2014 | Endo | |
| 2015/0268845 A1 | 9/2015 | Endo | |

FOREIGN PATENT DOCUMENTS

| JP | 2012014440 A | 1/2012 |
| JP | 2014215630 A | 11/2014 |
| JP | 2015179468 A | 10/2015 |

* cited by examiner

*Primary Examiner* — Martin Mushambo
(74) *Attorney, Agent, or Firm* — Holtz, Holtz & Volek PC

(57) ABSTRACT

A graphic display control device includes: a display screen; and a processor configured to perform: a graphic display control process to perform control to display a polygon on the display screen; a graphic value setting process to set a value denoting a characteristic for at least one of an angle and a side of the displayed polygon; an angle range determining process to determine a range of possible angle value as the value denoting the characteristic for a target angle of the displayed polygon based on the value denoting the characteristic set by the graphic value setting process; and an angle range display control process to perform control to display the range of possible angle value determined by the angle range determining process for the target angle.

6 Claims, 10 Drawing Sheets

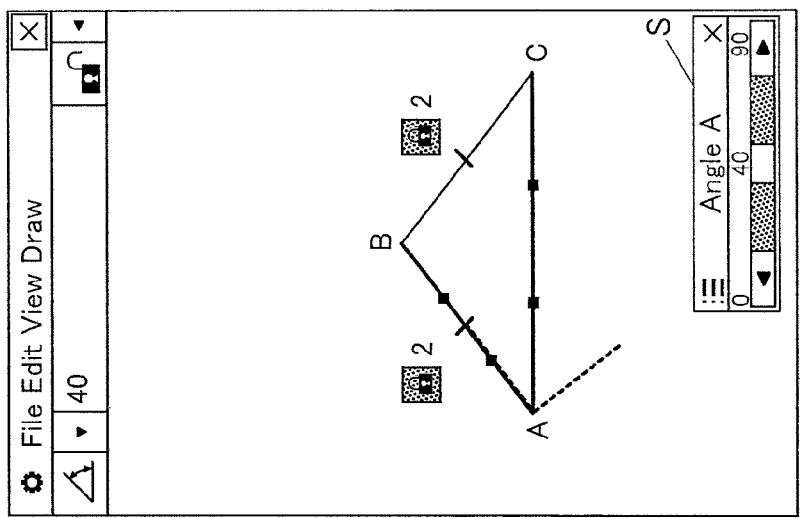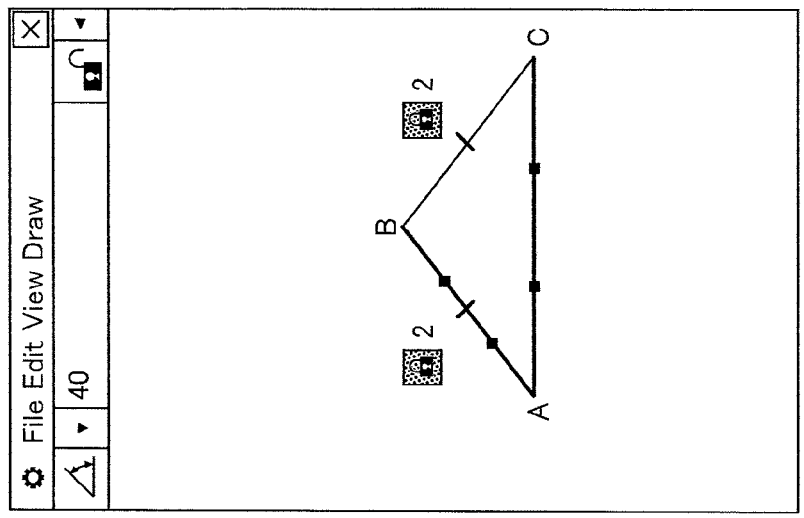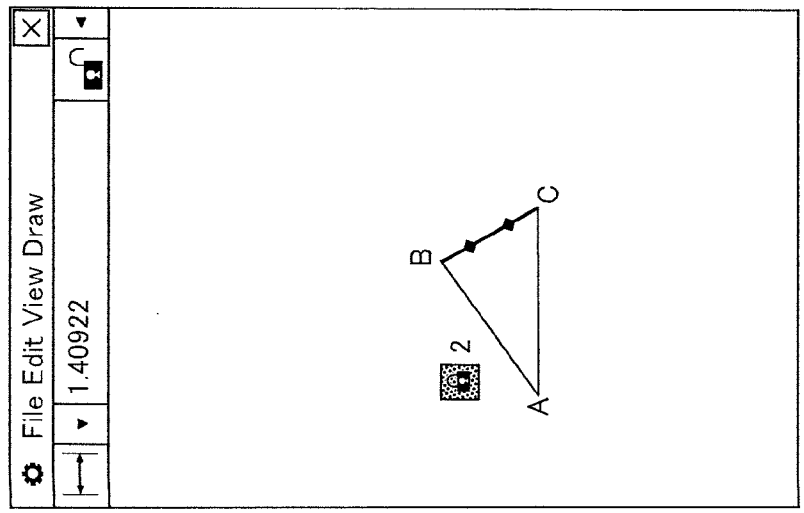

GRAPHIC DISPLAY CONTROL DEVICE, GRAPHIC DISPLAY CONTROL METHOD, AND STORAGE MEDIUM HAVING STORED THEREIN GRAPHIC DISPLAY CONTROL PROGRAM

BACKGROUND OF THE INVENTION

1. Field of the Invention

The present invention relates to a graphic display control device suitable for drawing any type of graphics, a graphic display control method, and a storage medium having stored therein a graphic display control program.

2. Description of Related Art

A typical graphic display control device selects a part of a graphic on a display screen and measures the selected part, such as the length of a side or an angle, to indicate the measured values on the display, or allows a user to set the length of the side or the angle (for example, Japanese Patent Application Unexamined Publication No. 2012-014440).

Unfortunately, a user cannot know the range of values for an angle of a polygon, for example, on a display screen of such a conventional graphic display control device. The user may set a larger or smaller value for the angle than the possible range and cause an error.

SUMMARY OF THE INVENTION

An object of the present invention, which has been made to solve the above problem, is to provide a graphic display control device, a graphic display control method, and a storage medium having stored therein a graphic display control program that appropriately indicate the possible range of angle value for an angle of a polygon on a display screen and to improve the usability.

In order to achieve the object, a graphic display control device according to one aspect of the present invention includes: a display screen; and a processor configured to perform following processes: displaying a polygon on the display screen; setting a value denoting a characteristic for at least one of an angle and a side of the displayed polygon; determining a range of possible angle value as the value denoting the characteristic for a target angle of the displayed polygon based on the value denoting the characteristic set by the setting; and displaying the range of possible angle value determined for the target angle.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention.

FIGS. 8A to 8C illustrate contents on the display screen.

DETAILED DESCRIPTION OF INVENTION

Figure 1:
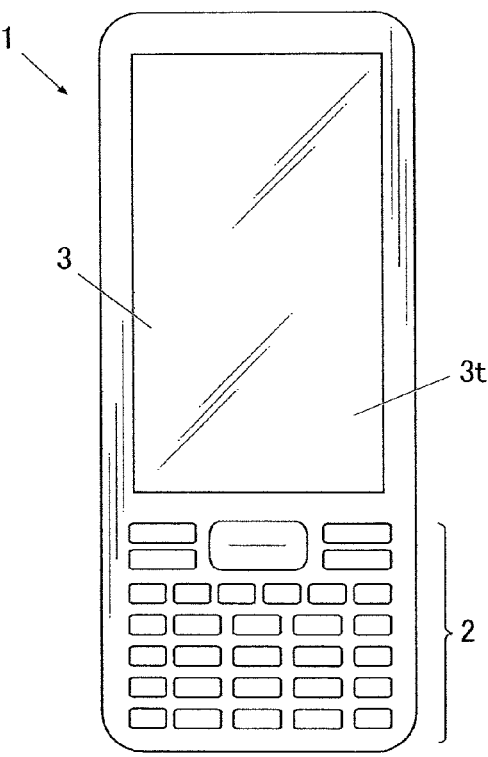
FIG. 1 is a plan view of a graphic display control device.

With reference to the accompanying drawings, an embodiment of the graphic display control device of the present invention will now be described in detail. It should be noted that the examples illustrated in the drawings are not construed to limit the scope of the invention.

[External Configuration]

FIG. 1 is a plan view of a graphic display control device 1 of the present embodiment. As shown in FIG. 1, the graphic display control device 1 includes an entry-key group 2 having various subgroups of keys, and a display screen 3.

The entry-key group 2 receives inputs of mathematical elements, such as numerical values and mathematical symbols, from a user, and receives various operational instructions. The entry-key group 2 includes a plurality of keys each of which has its own function. The entry-key group 2 includes numeric keys "0" to "9", and an EXE key (an enter key).

The display screen 3 may be a liquid crystal display (LCD) or an electronic luminescent display (ELD). The display screen 3 displays various kinds of data such as graphics and characters in a color mode. The display screen 3 includes a transparent touch panel 3t integrated over the display screen. The user can touch the touch panel 3t with a touch pen P to select an object on the display screen 3 (see FIG. 6B described below).

[Internal Configuration]

Figure 2:
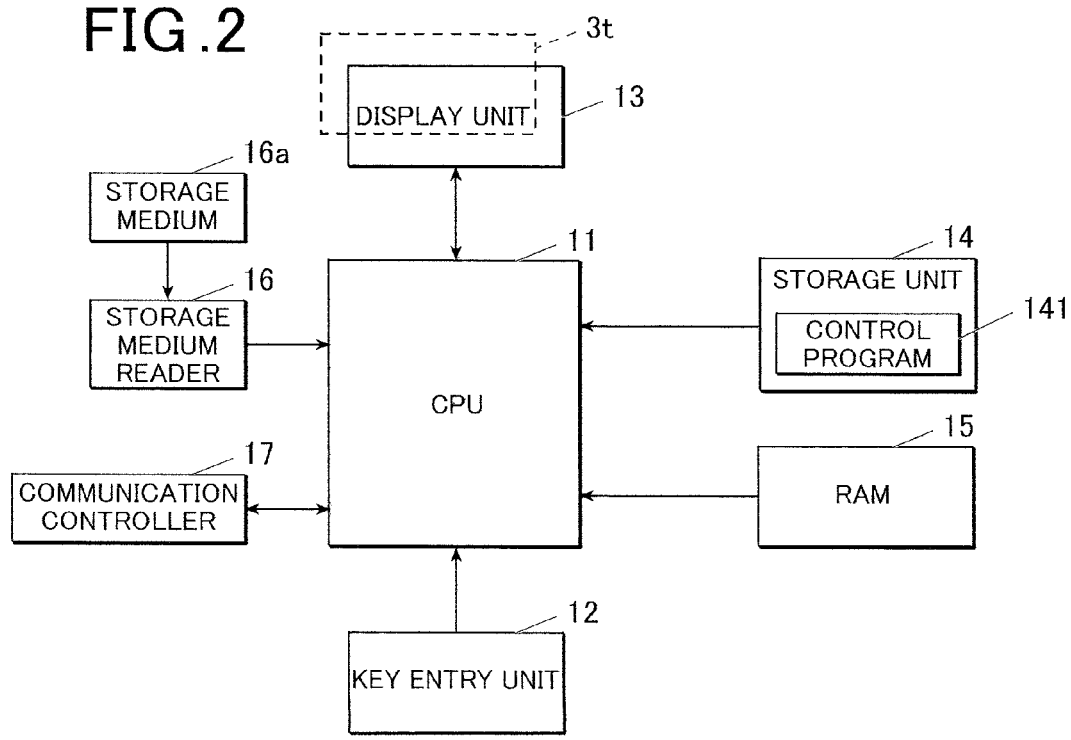
FIG. 2 is a block diagram illustrating the internal configuration of the graphic display control device.

The internal configuration of the graphic display control device 1 will now be described. FIG. 2 is a block diagram illustrating the internal configuration of the graphic display control device 1. As shown in FIG. 2, the graphic display control device 1 includes a key entry unit 12, a display unit 13, a storage unit 14, a random access memory (RAM) 15, a storage medium reader 16, a communication controller 17, and a central processing unit (CPU) 11.

The key entry unit 12 includes the entry-key group 2 described above, and sends the CPU 11 the key entry signals corresponding to the keys operated by the user. The CPU 11 receives the key entry signals corresponding to the keys operated by the user, and indicates the corresponding numerical values on the display unit or performs any calculation.

The display unit 13 includes the display screen 3 described above, and displays various kinds of information on the display screen 3 based on the display signals from the CPU 11. The display unit 13 sends the CPU 11 the information of the object touched by the user through the touch panel 3t with the touch pen P.

The storage unit 14 stores a control program and data for executing various functions of the graphic display control device 1, and has a storage area 141 for storing the control program. The storage area 141 also stores a program for instructing the graphic display control device 1 (or a computer) of the present invention to perform a graphic display control process.

The RAM 15 is a memory that functions as a work area for the CPU 11. The control program and the program for the graphic display control process of the present invention described above are expanded and executed in the work area of the RAM 15. The RAM 15 also functions as a memory that temporarily stores the data in process.

The storage medium reader 16 reads the information from an external information storage medium 16a such as a removable universal serial bus (USB) memory. The communication controller 17 is connectable to a network (not shown) for communication with external apparatuses, such as servers and computers, connected to the network.

The CPU 11 comprehensively controls the individual units of the graphic display control device 1. Specifically, the CPU 11 reads a program specified from among the control program and various application programs stored in the respective storage areas of the storage unit 14, expands the read program in the work area of the RAM 15, and executes various processes in cooperation with the expanded program in the RAM 15. The CPU 11 performs various processes such as a process for instructing the display unit 13 to display required indications on the display screen 3.

[Operation]

With reference to the flow charts shown in FIGS. 3 to 5, the operation of the graphic display control device 1 of the present embodiment will now be described. The functions of the graphic display control device 1 of the present embodiment will also be described. Since the operation of the graphic display control device 1 described below takes place in accordance with the program of the present invention, the following explanation also relates to the program of the present invention.

When a geometry function is selected in a main menu displayed on the display screen 3 (Step S1; Yes), a drawing function is selected (Step S2; Yes), and a basic graphic function is selected (Step S3; Yes) according to a user operation, the CPU 11 selects a type of graphic (for example, a triangle) designated by the user operation from among polygons (Step S4). The user then touches the touch panel 3t of the display screen 3 with the touch pen P, and the CPU 11 receives the input of the points of the drawing position (for example, three points in the case of a triangle) according to a user operation (Step S5). Based on the inputted points, the CPU 11 draws a polygon (for example, a triangle) on the display screen 3 (Step S6).

In this way, the CPU 11 displays a polygon graphic on the display screen 3. The following description will focus on the display of a triangle on the display screen 3. It should be noted that any other polygon, such as a tetragon, can also be displayed.

If the user designates one of the sides of the displayed triangle (Step S7; Yes), the CPU 11 displays the current value of the designated side and displays a fixation or variation mark (Step S8). Specifically, if the user touches the side BC of the displayed triangle with the touch pen P to designate it as shown in FIG. 8A (Step S7; Yes); the designated side BC is made bold and two black square marks are added on the side BC.

The CPU 11 then calculates the current value of the designated side BC and displays the calculated value (1.40922 in the case of FIG. 8A) in the upper area of the display screen 3. At this time, the value of the side BC is not fixed yet by the user and variable (in other words, the value can be changed). For this sign, an open padlock mark is displayed as a variation mark on the right of the current value of the side BC in the upper area of the display screen 3 (Step S8).

Under this condition, if the user inputs a numerical value to set the length of the designated side BC, which is a characteristic of the side BC (Step S9), the CPU 11 changes the length (the characteristic) of the designated side BC to the user-set value (not shown). The CPU 11 then modifies the shape of the graphic (the triangle) so that the value of the side BC is the set value, and displays the modified graphic (Step S10). Specifically, if the user inputs a value "2" as the value of the side BC (Step S9), the CPU 11 modifies the shape of the triangle by making the side BC shown in FIG. 8A longer or shorter so as that the value of the side BC is the value "2", and displays the modified triangle (Step S10).

Under this condition, if the user presses the EXE key, the CPU 11 fixes the value of the side BC to "2", that is, sets the length of the side BC to "2". The CPU 11 then changes the mark in the upper area of the display screen 3 from the variation mark (the open padlock mark) to a fixation mark (a closed padlock mark), and also displays the fixation mark together with numeral "2" near the side BC. The fixation mark and numeral "2" near the side AB in FIG. 8A indicates that the value of the side AB is fixed to "2" in the same way as described above.

If the user designates one of the angles of the displayed triangle (Step S11; Yes), the CPU 11 displays the current value of the designated angle and displays the fixation or variation mark (Step S12). In the present embodiment, as in the case of the angle B shown in FIG. 6A, the user designates the angle B by touching the two sides AB and BC forming the angle B of the triangle with the touch pen P (Step S11; Yes). The CPU 11 then calculates the current value of the designated angle B and displays the calculated value in the upper area of the display screen 3. If the angle B is not fixed yet, the CPU 11 displays the variation mark on the right of the value (Step S12).

Figure 6C:
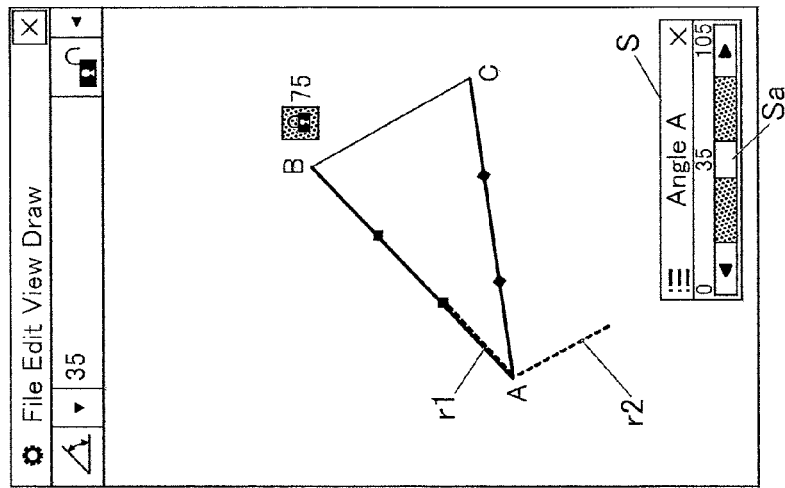
FIGS. 6A to 6C illustrate contents on the display screen.
Figure 6B:
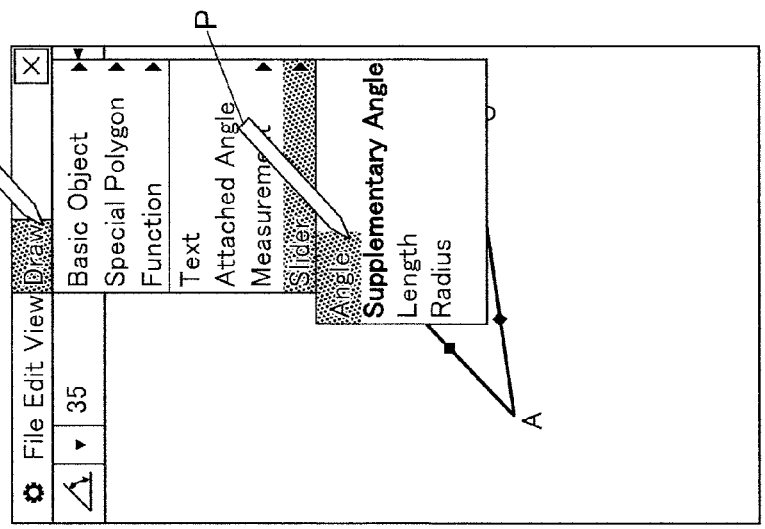
Figure 6A:
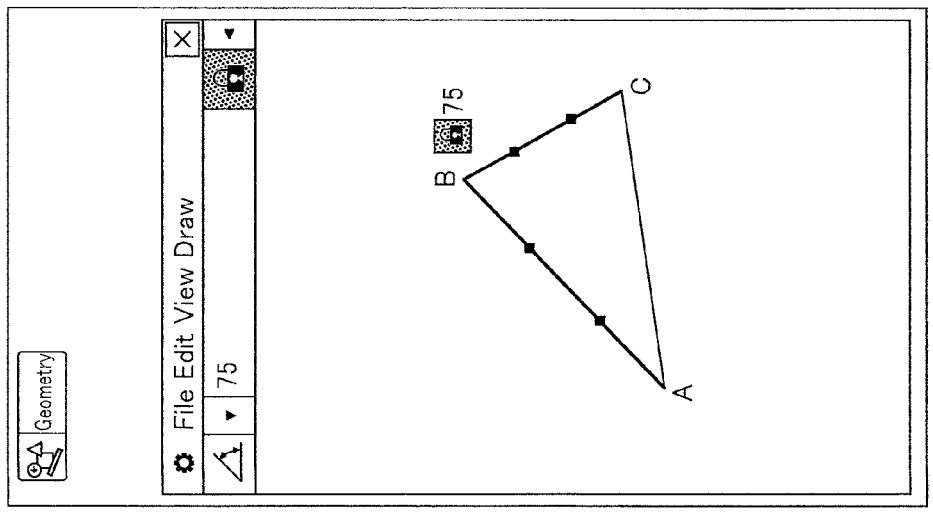

Under this condition, if the user inputs a numerical value ("75" in this case) to set the angle value of the designated angle B, which is a characteristic of the angle B, as shown in FIG. 6A (Step S13; Yes), the CPU 11 changes the angle value (the characteristic) of the designated angle B to the user-set value, modifies the shape of the graphic so that the value of the angle B is the set value, and displays the modified graphic (Step S14). Specifically, if the user inputs a value "75" as the value of the angle B (Step S13), the CPU 11 modifies the shape of the triangle by making the angle B wider or narrower so that the value of the angle B is 75° and displays the modified triangle as shown in FIG. 6A (Step S14).

Under this condition, if the user presses the EXE key, the CPU 11 fixes the value of the angle B to 75°, changes the mark in the upper area of the display screen 3 from the variation mark to the fixation mark, and displays the fixation mark and numeral 75 near the angle B (See FIG. 6A).

Under the condition that the angle B is fixed to 75° as shown in FIG. 6A, if the user designates the angle A by touching the sides AB and AC with the touch pen P (Step S11; Yes), but does not input a numerical value (Step S13; No), and sets up a slider by a touching operation with the touch pen P as shown in FIG. 6B (Step S15; Yes); the CPU 11 performs a process for determining a range of possible angle value (Step S16). FIGS. 4 and 5 are flow charts illustrating the process for determining the range of possible angle value.

Figure 4:
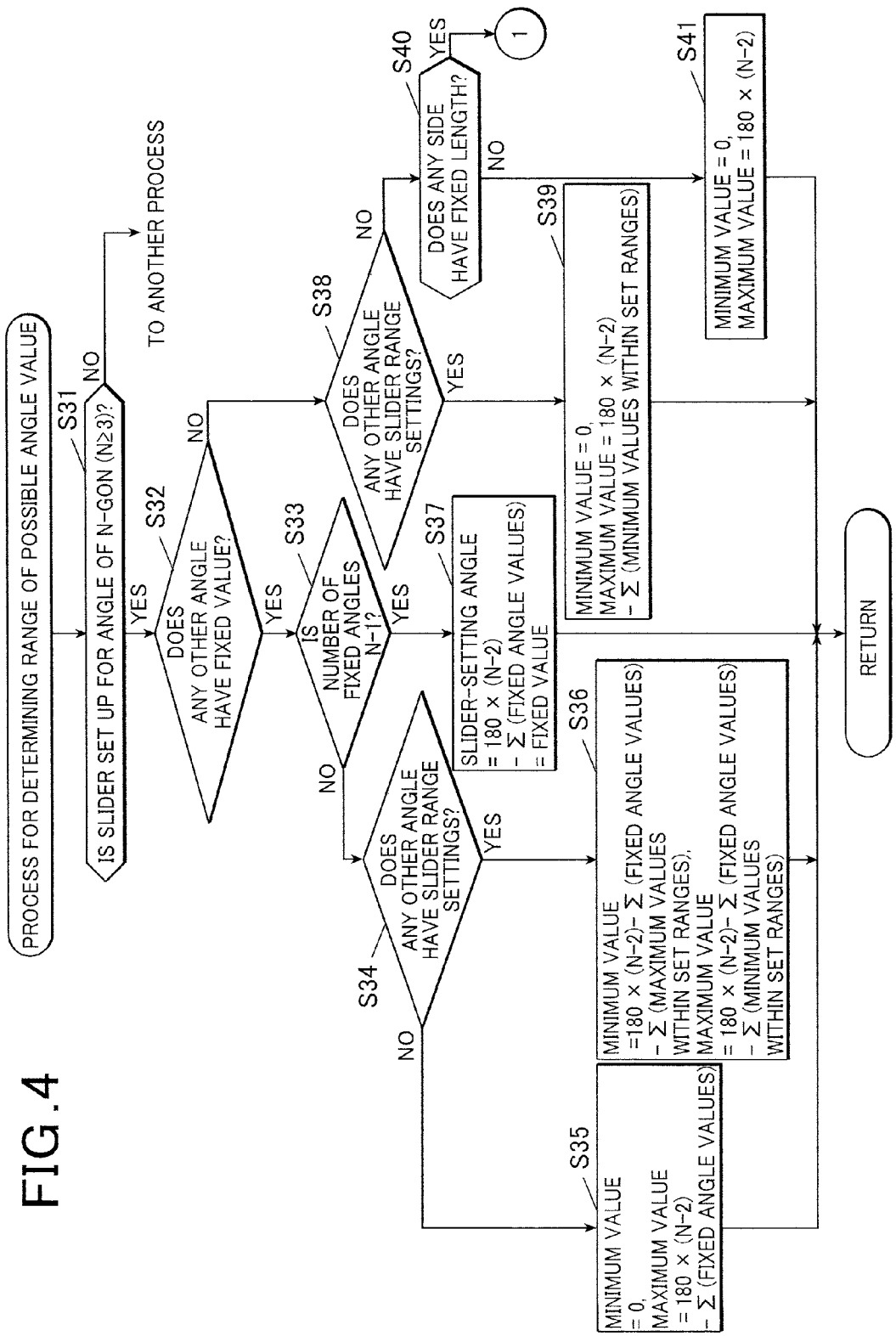
FIG. 4 is a flow chart illustrating a process for determining a range of possible angle value in the graphic display device.

In the process for determining the range of possible angle value, a slider is set up for an angle of an n-gon (n≥3) (See "Angle" in FIG. 6B) (Step S31 in FIG. 4; Yes). In this case, the angle B is fixed to 75° (Step S32; Yes). Since only the angle B is a fixed angle, the number of fixed angles is not n−1=3−1=2 (n=3, a triangle) (Step S33; No). The process thus goes to Step S34.

In this case, since slider range settings have not been made for any of the other angles as described below (Step S34; No), the CPU 11 determines the minimum and maximum values of the range of the slider S based on the sum of the interior angles of an n-gon, 180°×(n−2), as follows (Step S35):

Minimum Value=0°; and

Maximum Value=180°×(n−2)−Σ(fixed angle values)    (1).

In this way, the CPU 11 determines the range of possible angle value of the angle A as a range within which the user can change and set the value of the angle. In this case, since the graphic is a triangle, then n=3, and only the angle B has the fixed value 75°; the maximum value is calculated to be 105°.

After the CPU 11 determines the minimum and maximum values of the range of the slider S (Step S35), the CPU 11 finishes the process for determining the range of possible angle value (Step S16 in FIG. 3), and sets the slider S having the determined range of possible angle value for the designated angle A (Step S17). In this case, since the range of possible angle value is from 0° to 105°, which is not a fixed value (that is, a single value) but a certain range of values (Step S18; No), the CPU 11 displays the slider S on the display screen 3 as shown in FIG. 6C.

The slider S indicates the minimum value of the range of possible angle value (0° in this case) on the left end and the maximum value (105° in this case) on the right end. The slider S has an indicator Sa in the lower area. The user can slide the indicator Sa from side to side by horizontally sliding the touch pen P while touching the indicator Sa on the display screen 3 with the touch pen P. In this way, the user operates the slider to change a value of an angle (the angle A in this case) within the range of possible angle value described above.

When the user touches the left button (the leftward triangle) or the right button (the rightward triangle) respectively displayed on the left and right of the indicator Sa with the touch pen P, the user can change the value of the angle A by 5°, for example, for one touch. The slider S indicates the current value of the angle A (35° in the case of FIG. 6C) above the indicator Sa (and between the minimum and maximum values of the range of possible angle value, for example). The current value of the angle is varied in response to the rightward or leftward sliding of the indicator Sa by the user.

The CPU 11 displays the slider S, and red dashed lines r1 and r2 around the angle A to allow the user to readily know the range of possible angle value of the angle A as shown in FIG. 6C. The line r1 indicates the position of the side AC at the minimum value of the range of possible angle value of the angle A (0° in this case). The line r2 indicates the position of the side AC at the maximum value of the range of possible angle value of the angle A (105° in this case).

Figure 3:
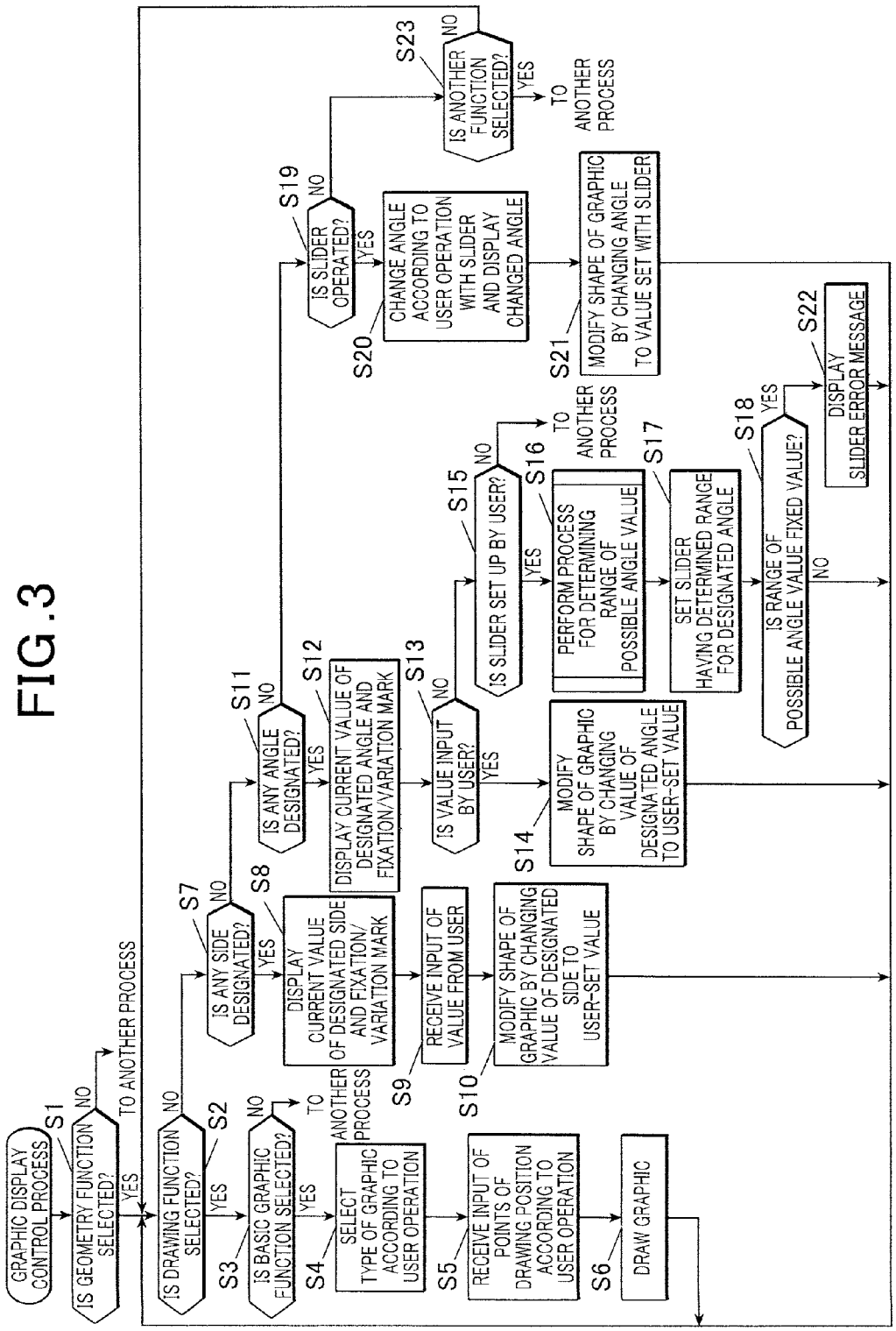
FIG. 3 is a flow chart illustrating a graphic display control process in the graphic display control device.
Figure 7A:
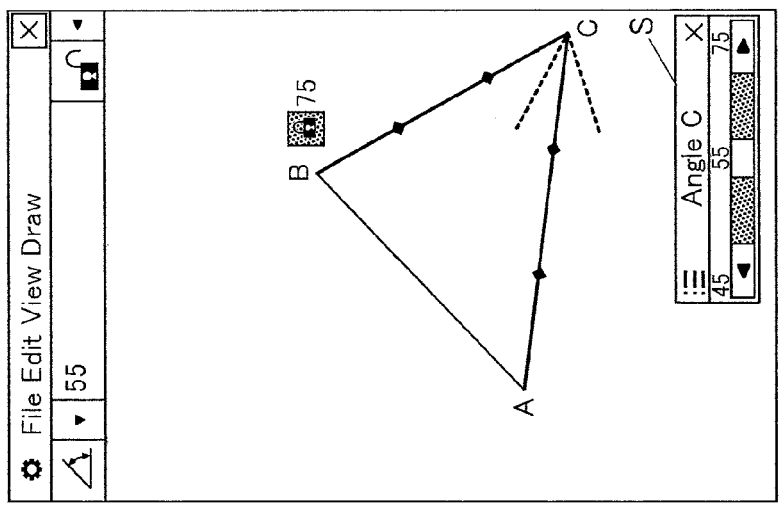
FIGS. 7A to 7C illustrate contents on the display screen.

If the user operates the slider in FIG. 6C (Step S19 in FIG. 3; Yes) to set the value of the angle A to 50°, for example, as shown in FIG. 7A, the CPU 11 displays the angle value set by the user with the slider S (50° in this case) in the upper area of the display screen 3 (Step S20). In this case, since the angle A is not fixed yet, the variation mark (the open padlock mark) is displayed to the right of the value.

The CPU 11 changes the value of the angle A to 50° set by the user with the slider, modifies the shape of the triangle by expanding the angle A, and displays the modified triangle as shown in FIG. 7A (Step S21).

Figure 7B:
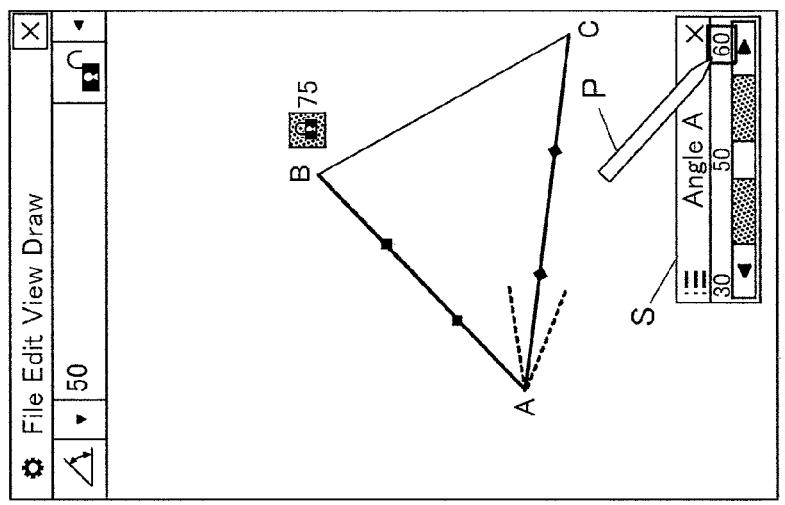

In the present embodiment, as shown in FIG. 7B, the user can change the minimum and maximum values of the range of possible angle value of an angle (the angle A in the case of FIG. 7B) by touching the minimum and maximum values of the range of possible angle value respectively indicated on the left end and right end of the slider S with the touch pen P, inputting a numerical value with the numeric keys, and pressing the EXE key. FIG. 7B illustrates the slider S after the minimum and maximum values, respectively, of the range of possible angle value are varied from "0" and "105" to "30" and "60" (that is, the range of possible angle value is varied from "0° to 105°" to "30° to 60°").

Figure 7C:
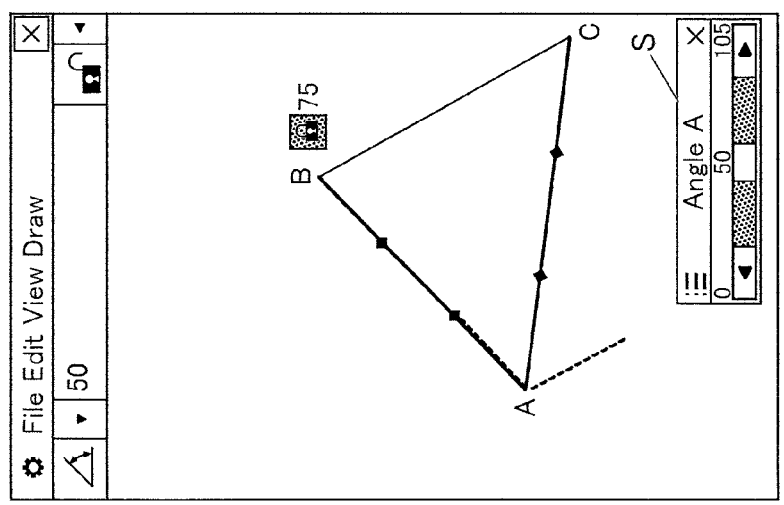

In the case shown in FIG. 7B, under the condition that the angle B is fixed to 75° and the angle A has a range of possible angle value of 30° to 60° set with the slider S, the user deletes the slider S for the angle A from the display screen 3, and then the user sets up a slider for the angle C as shown in FIG. 7C (Step S15 in FIG. 3; Yes). In this connection, the user can delete the slider S from the display screen 3 by touching the area other than the slider S area and the graphic area with the touch pen P on the display screen 3 when the slider S is on the display screen 3.

In this case, in the process for determining the range of possible angle value shown in FIG. 4, the angle B is fixed to 75° (Step S32; Yes), the number of fixed angles is one (Step S33; No), the angle A has the range of possible angle value with the slider S (that is, the angle A has slider range settings) (Step S34; Yes). Under this condition, the CPU 11 determines the minimum and maximum values of the range of the slider S for the angle C based on the sum of the interior angles of an n-gon, 180°×(n−2), as follows (Step S36):

Minimum Value=180°×(n−2)−Σ(fixed angle values)− (maximum values within the set range); and Maximum Value=180°×(n−2)−Σ(fixed angle values)− Σ(minimum values within the set ranges)    (2).

Specifically, in FIG. 7B, the angle B of the triangle is fixed to 75° and the angle A has the range of possible angle value of 30° to 60°. Therefore, the angle C can be changed only within the range from 45° to 75°. According to Expression (2), the following values are obtained:

Minimum Value=180°×(3−2)−75°−60°=45°; and

Maximum Value=180°×(3−2)−75°−30°=75°.

The calculated results at Step S36 also demonstrate that the range of possible angle value for the angle C is from 45° to 75°.

In this way, the CPU 11 sets the minimum value of the range of possible angle value for the angle C to 45° and the maximum value to 75° (Step S36), and finishes the process for determining the range of possible angle value (Step S16 in FIG. 3). The CPU 11 then sets the slider S having the determined range of possible angle value for the designated angle C (Step S17). In this case, since the range of possible angle value is from 45° to 75°, which is not a fixed value but a certain range of values (Step S18; No), the CPU 11 displays the slider S having the minimum value "45" and the maximum value "75" on the display screen 3 as shown in FIG. 7C. FIG. 7C illustrates the case in which the current value (angle value) of the angle C is 55°.

In the process for determining the range of possible angle value, if the user sets up a slider for an angle of an n-gon (n≥3) (Step S31; Yes), if any of the angles other than the designated angle has a fixed value (Step S32; Yes), and if the number of the fixed angles is (n−1) (Step S33; Yes); the angle θ of the designated angle is calculated as follows (Step S37):

$$\theta = 180° \times (n-2) - \Sigma(\text{fixed angle values}) \quad (3).$$

Since the angle θ is a fixed value, that is, a single value, not a certain range of values (Step S18 in FIG. 3; Yes), the CPU displays an error message Me on the display screen 3 to notify the user that the designated angle has a fixed value (Step S22).

Figure 9C:
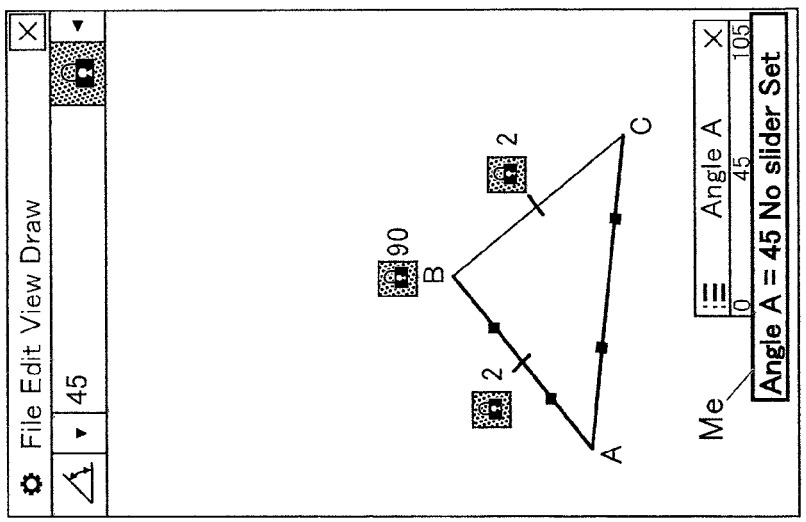
FIGS. 9A to 9C illustrate contents on the display screen.

In other words, if the angle θ of the designated angle is a fixed value, the CPU 11 displays the calculated angle θ of the designated angle (the angle θ of the angle A=45°, in the case of FIG. 9C) together with the error message Me, "No slider set", which notifies the user that the angle θ of the designated angle is a fixed value and no slider can be displayed, as shown in FIG. 9C described below.

In the process for determining the range of possible angle value, if the user sets up a slider for an angle of an n-gon (n≥3) (Step S31; Yes), if none of the angles other than the designated angle has a fixed value (Step S32; No), and if any of the other angles has slider range settings (Step S38; Yes); the CPU 11 determines the minimum and maximum values of the range of the slider S for the designated angle based on the sum of the interior angles of an n-gon, 180°×(n−2), as follows (Step S39):

Minimum Value=0°; and $$\text{Maximum Value} = 180° \times (n-2) - \Sigma(\text{minimum values within the set ranges}) \quad (4).$$

In this way, the CPU 11 determines the range of possible angle value of the designated angle as a range within which the user can change and set the value of the angle, and finishes the process for determining the range of possible angle value (Step S16 in FIG. 3).

In the process for determining the range of possible angle value, if the user sets up a slider for an angle of an n-gon (n≥3) (Step S31; Yes), if none of the angles other than the designated angle has a fixed value (Step S32; No), if none of the other angles has slider range settings (Step S38; No), and if no side has a fixed length (Step S40; No); the CPU 11 determines the minimum and maximum values of the range of the slider S for the designated angle based on the sum of the interior angles of an n-gon, 180°×(n−2), as follows (Step S41):

Minimum Value=0°; and $$\text{Maximum Value} = 180° \times (n-2) \quad (5).$$

In this way, the CPU 11 determines the range of possible angle value of the designated angle as a range within which the user can change and set the value of the angle, and finishes the process for determining the range of possible angle value (Step S16 in FIG. 3).

[Process for Triangle]

In the process for determining the range of possible angle value, if the user sets up a slider for an angle of an n-gon (n≥3) (Step S31; Yes), if none of the angles other than the designated angle has a fixed value (Step S32; No), if none of the other angles has slider range settings (Step S38; No), if any side has a fixed length (Step S40; Yes), and if the polygon is a triangle (Step S51 in FIG. 5; Yes); the CPU 11 performs the process for determining the range of possible angle value based on the nature of a triangle.

If the polygon is not a triangle (Step S51; No), the CPU 11 determines the minimum and maximum values of the range of the slider S for the designated angle based on Expression (5) as described above in Step S41 (Step S52), and determines the range of possible angle value of the designated angle as a range within which the user can change and set the value of the angle, and finishes the process for determining the range of possible angle value (Step S16 in FIG. 3).

If the polygon is a triangle (Step S51; Yes), and if the three sides of the triangle have fixed values (lengths) (Step S53; Yes), all the angles of the triangle are fixed angles or values. So, if the user sets up a slider for any of the angles, the CPU 11 calculates the current angle based on the fixed values of the three sides and determines the current angle as a fixed value (Step S54).

The CPU 11 then finishes the process for determining the range of possible angle value (Step S16 in FIG. 3). In this case, since the range of possible angle value for the designated angle is a fixed value (Step S18; Yes), the CPU 11 displays the error message Me on the display screen 3 in the same way as in FIG. 9C described below (Step S22).

Figure 5:
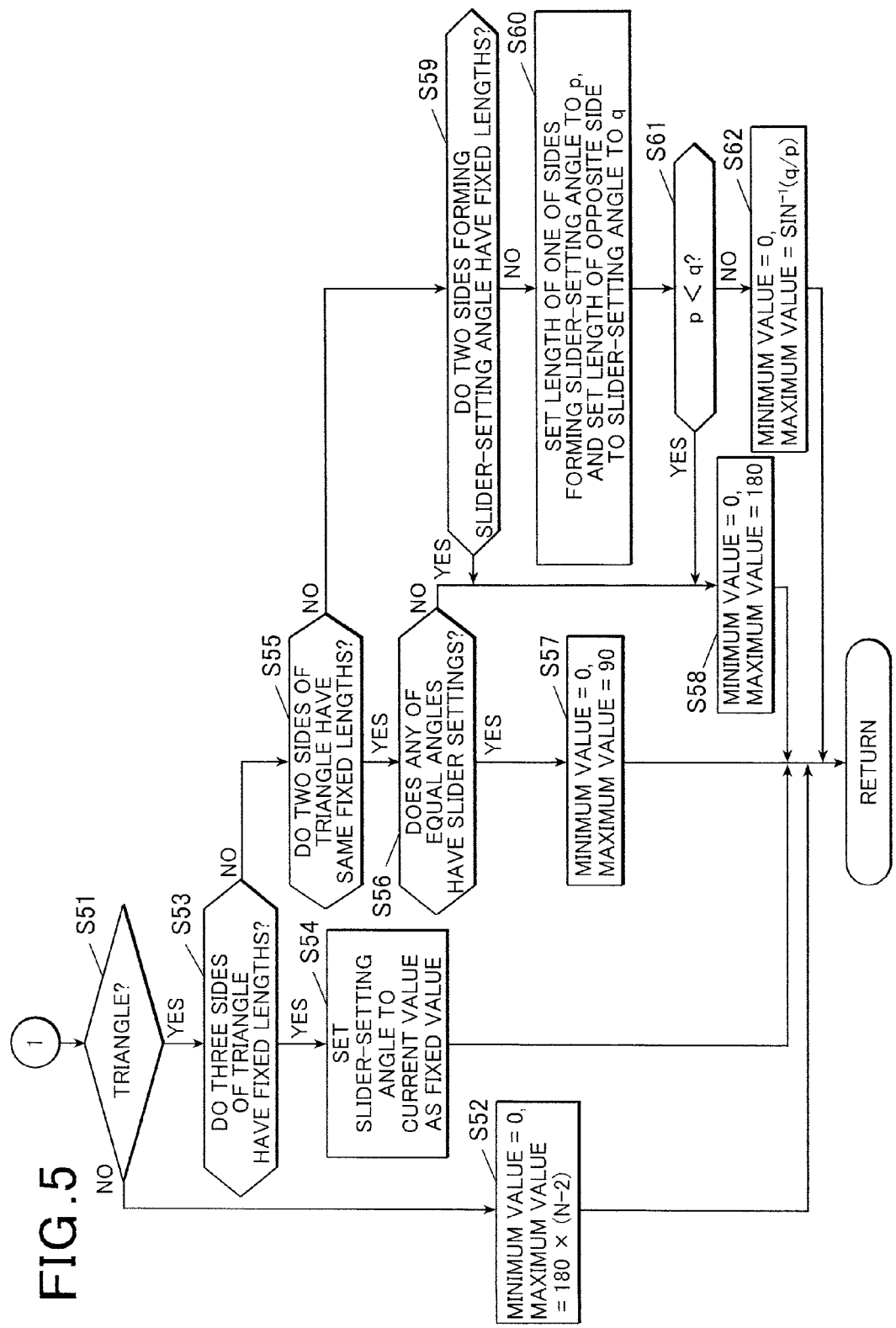
FIG. 5 is a flow chart illustrating a process for determining a range of possible angle value in the graphic display control device.

If not all the three sides of the triangle have fixed values (Step S53 in FIG. 5; No), but two of the sides of the triangle have the same fixed value (Step S55; Yes), which indicates that the triangle is an isosceles triangle, and if the user sets up a slider for one of the equal angles (also referred to as the base angles) (Step S56; Yes); the CPU 11 determines the minimum and maximum values of the range of the slider S for the equal angle as follows (Step S57):

Minimum Value=0°; and $$\text{Maximum Value} = 90° \quad (6).$$

In this way, the CPU 11 determines the range of possible angle value of the designated angle as a range within which the user can change and set the value of the angle, and finishes the process for determining the range of possible angle value (Step S16 in FIG. 3).

If the user designates the angle A of the equal angles of the isosceles triangle as shown in FIG. 8B, the CPU 11 sets the slider S having the determined range of possible angle value of 0° to 90° for the designated angle A of the equal angles (Step S17), and displays the slider S on the display screen 3 as shown in FIG. 8C.

Under this condition, if the user operates the slider (Step S19 in FIG. 3; Yes) to change the value of the angle A of the equal angles to 30°, for example, as shown in FIG. 9A, the CPU 11 displays the angle value set by the user with the slider S (30° in this case) in the upper area of the display screen 3 (Step S20). At the same time, as shown in FIG. 9A, the CPU 11 changes the angle A to 30° as set by the user with the slider, modifies the shape of the triangle by contracting the angle A, and displays the modified triangle (Step S21). The angle C, which is the other of the equal angles, is changed to the same angle 30° as the angle A due to the nature of an isosceles triangle. The CPU 11 thus modifies the shape of the triangle such that both the equal angles A and C are 30°, and displays the modified triangle (Step S21).

Figure 9B:
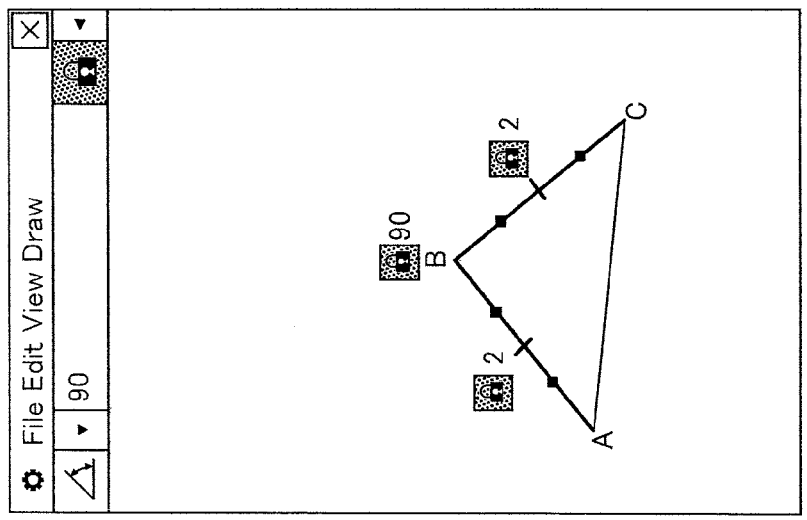
Figure 9A:
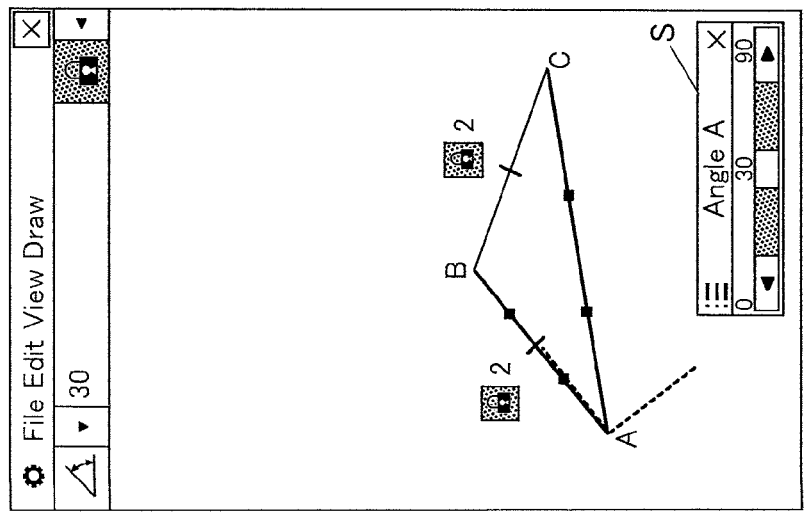

As shown in FIG. 9B, under the condition that the two sides AB and BC have the same fixed value (Step S55 in FIG. 5; Yes), and the apex angle B has a fixed value of 90°, for example; the user sets up a slider for the angle A of the equal angles in the same way as described above. In this case, since the angle A has a fixed value 45° (Step S18 in FIG. 3; Yes), the CPU 11 displays the error message Me on the display screen 3 as shown in FIG. 9C (Step S22).

Although not shown, suppose two sides of a triangle has the same fixed value (Step S55; Yes), which indicates that the triangle is an isosceles triangle, and any of the equal angles does not have slider settings for (Step S56; No), i.e., a slider is set up for the apex angle. In such a case, since the apex angle has the range from 0° to 180°, the CPU 11 determines the minimum and maximum values of the range of the slider S for the apex angle as follows (Step S58):

Minimum Value=0°; and

Maximum Value=180°                      (7).

In this way, the CPU 11 determines the range of possible angle value of the designated angle as a range within which the user can change and set the value of the angle, and finishes the process for determining the range of possible angle value (Step S16 in FIG. 3). The CPU then sets the slider S having the determined range of possible angle value of 0° to 180° for the designated apex angle (Step S17), and displays the slider S on the display screen 3.

Although not shown, suppose two sides of a triangle do not have the same fixed value (Step S55 in FIG. 5; No), but if the two sides forming the angle for which the user is to set a slider have fixed values (Step S59; Yes). In such a case, the angle formed by the two sides having the fixed values can be set within the angle range from 0° to 180°. The CPU 11 thus determines the minimum and maximum values of the range of the slider S for the designated angle in the same way as Expression (7) as follows (Step S58):

Minimum Value=0°; and

Maximum Value=180°.

In this way, the CPU 11 determines the range of possible angle value of the designated angle as a range within which the user can change and set the value of the angle, and finishes the process for determining the range of possible angle value (Step S16 in FIG. 3). The CPU 11 then sets the slider S having the determined range of possible angle value of 0° to 180° for the designated angle (Step S17), and displays the slider S on the display screen 3.

If a polygon is a triangle (Step S51 in FIG. 5; Yes), and if neither of Steps S53, S55, and S59 holds (Step S53, S55, and S59; No); the CPU 11 determines whether Expression (8) holds or not (Step S61).

$p<q$                      (8)

where p denotes the value (length) of one of the two sides forming the angle for which the user is to set a slider (hereinafter referred to as a first side), and q denotes the value (length) of the opposite side to the angle (hereinafter referred to as a second side) (Step S60).

Figure 10C:
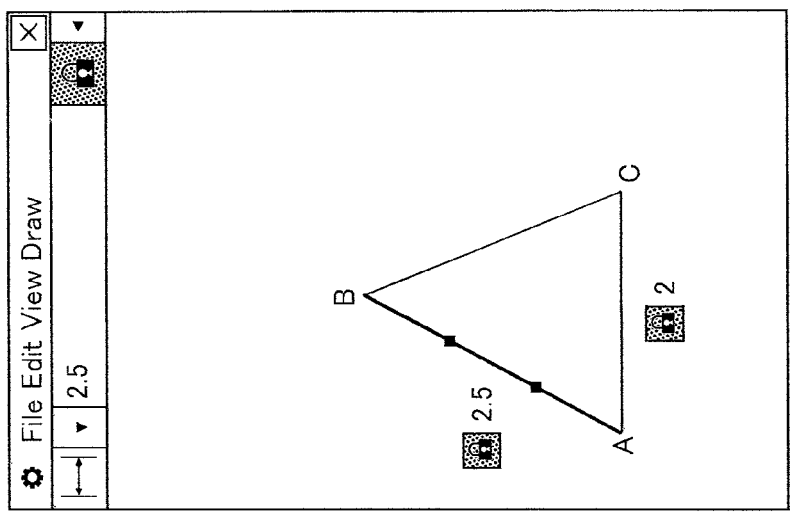
FIGS. 10A to 10C illustrate contents on the display screen.
Figure 10B:
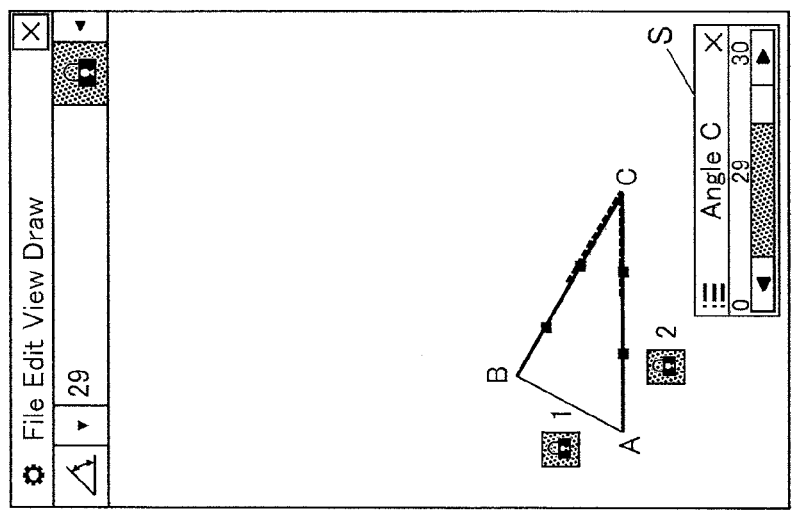
Figure 10A:
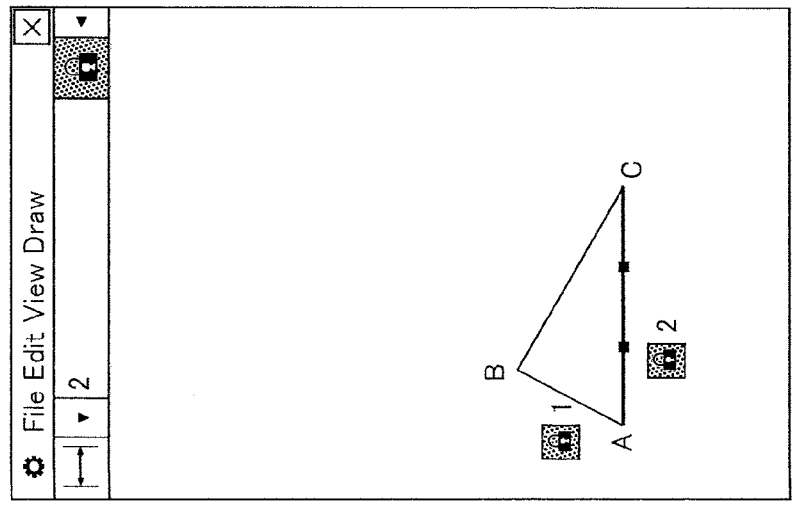

Specifically, as shown in FIG. 10A, if the user sets up a slider for the angle C with the side AB having a value "1" and with the side AC having a value "2", i.e., p=2 and q=1; the CPU 11 determines that p<q does not hold (Step S61; No), that is, that p (the value of the first side) is equal to or larger than q (the value of the second side). In this case (Step S61; No), the CPU 11 determines the maximum value of the range of possible angle value for the angle C based on the relationship between p (the value of the first side) and q (the value of the second side).

In a triangle, the sine theorem holds as follows:

$a/\sin A = b/\sin B = c/\sin C$             (9)

where A, B, and C denote the values of the angles A, B, and C, respectively; and a, b, and c denote the lengths of the opposite sides to the angles A, B, and C, respectively. Expression (9) can be changed to:

$\sin C = \sin B \times c/b$; and to $C = \sin^{-1}(\sin B \times c/b)$              (10).

In this case, by substituting p for b and q for c, Expression (11) is derived from Expression (10):

$C = \sin^{-1}(\sin B \times q/p)$              (11).

The maximum value of sin B is "1" at B=90°. The maximum value of the angle C, that is, the maximum value of the range of possible angle value for the angle C, is expressed by $C = \sin^{-1}(q/p)$ at sin B=1.

If the CPU 11 determines that p<q does not hold (Step S61; No), that is, p (the value of the first side) is equal to or larger than q (the value of the second side), the CPU 11 determines that the maximum value of the range of possible angle value for the angle C is $\sin^{-1}(q/p)$. The CPU 11 then determines the minimum and maximum values of the range of the slider S for the angle C as follows (Step S62):

Minimum Value=0°; and

Maximum Value=$\sin^{-1}(q/p)$              (12)

In this way, the CPU 11 determines the range of possible angle value of the designated angle as a range within which the user can change and set the value of the angle, and finishes the process for determining the range of possible angle value (Step S16 in FIG. 3).

In the case shown in FIG. 10A, since p=2 and q=1 hold and $\sin^{-1}(q/p)$=30° holds, the CPU 11 sets the slider S having the determined range of possible angle value of 0° to 30° for the designated angle C as shown in FIG. 10B (Step S17 in FIG. 3), and displays the slider S on the display screen 3.

If the user deletes the slider S from the display screen 3 shown in FIG. 10B, if the user changes the value of the side AB of the triangle from "1" to "2.5", for example, as shown in FIG. 10C, and if the user sets up a slider for the angle C; the CPU 11 determines that p is "2", q is "2.5", and that p<q holds (Step S61 in FIG. 5; Yes). In this case, the angle C can be set within the angle range from 0° to 180°.

In this case, the CPU 11 determines the minimum and maximum values of the range of the slider S for the angle C in the same way as Expression (7) as follows (Step S58):

Minimum Value=0°; and

Maximum Value=180°.

In this way, the CPU 11 determines the range of possible angle value of the designated angle as a range within which the user can change and set the value of the angle, and finishes the process for determining the range of possible angle value (Step S16 in FIG. 3). The CPU 11 then sets the slider S having the determined range of possible angle value of 0° to 180° for the designated angle C (Step S17), and displays the slider S on the display screen 3 as shown in FIG. 11A.

Figure 11A:
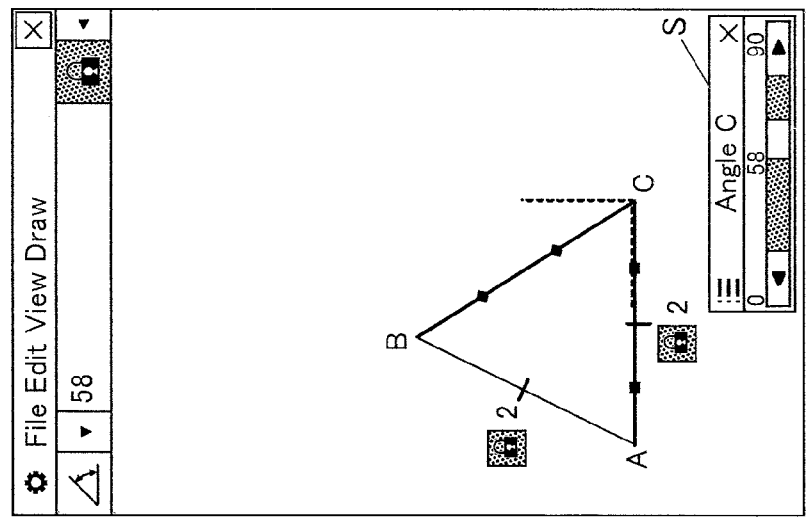
FIGS. 11A to 11C illustrate contents on the display screen.
Figure 11B:
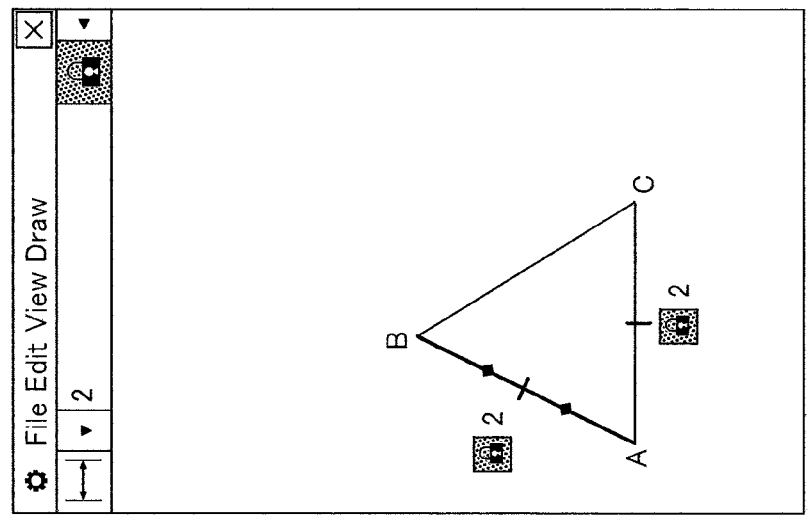
Figure 11C:
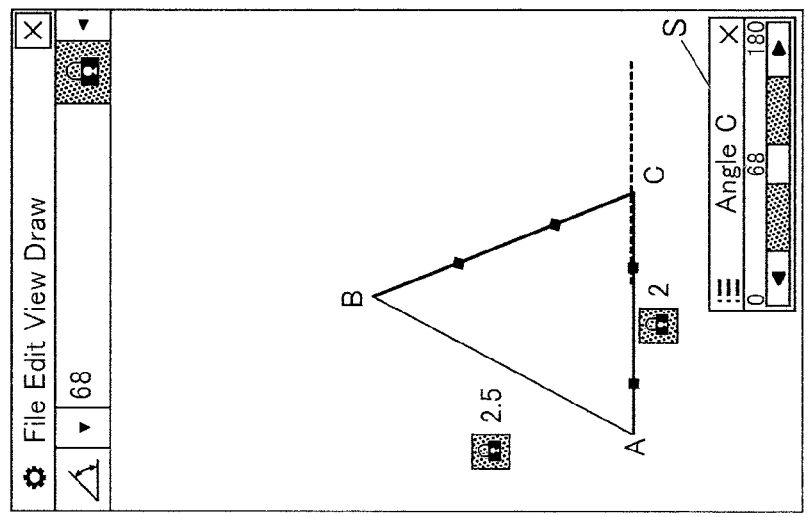

If the user deletes the slider S from the display screen 3 shown in FIG. 10B or 11A, and if the user changes the value of the side AB of the triangle to "2", for example, as shown in FIG. 11B, the triangle becomes isosceles. If the user then sets up a slider for the angle C as shown in FIG. 11C, both Steps S55 and S56 in FIG. 5 hold. The CPU 11 thus determines the minimum and maximum values of the range of the slider S for the angle C in the same way as Expression (6) as follows (Step S57):

Minimum Value=0°; and

Maximum Value=90°.

In this way, the CPU 11 determines the range of possible angle value of the designated angle as a range within which the user can change and set the value of the angle, and finishes the process for determining the range of possible angle value (Step S16 in FIG. 3).

The CPU 11 sets the slider S having the determined range of possible angle value of 0° to 90° for the designated angle C (Step S17), and displays the slider S on the display screen 3 as shown in FIG. 11C.

Advantageous Effects

As described above, the graphic display control device 1 and the program of the present embodiment can appropriately display the range of possible angle value for an angle of a polygon on the display screen 3 and reliably improve usability for users.

The embodiment of the present invention and their variations described above should not be construed to limit the scope of the present invention which includes the claimed scope and its equivalent.

The entire disclosure of Japanese Patent Application No. 2015-048961 filed on Mar. 12, 2015 including description, claims, drawings, and abstract are incorporated herein by reference in its entirety.

Although an exemplary embodiment has been shown and described, the invention is not limited to the embodiment shown. Therefore, the scope of the invention is intended to be limited solely by the scope of the claims that follow.

What is claimed is:

1. A graphic display control device comprising:
   a display screen; and
   a processor configured to perform processes comprising:
      displaying a polygon on the display screen;
      setting a value denoting a characteristic for at least one of an angle and a side of the displayed polygon;
      determining a range of possible angle values as the value denoting the characteristic for a target angle of the displayed polygon based on the value denoting the characteristic set by the setting; and
      displaying the range of possible angle values determined for the target angle,
   wherein:
      the polygon is a triangle; and
      the processor is configured such that, if the processor determines that two sides of the triangle are equal to each other in length, the processor determines the range of possible angle values for the target angle based the two sides being equal to each other in length.

2. A graphic display control device comprising:
   a display screen; and
   a processor configured to perform processes comprising:
      displaying a polygon on the display screen;
      setting a value denoting a characteristic for at least one of an angle and a side of the displayed polygon;
      determining a range of possible angle values as the value denoting the characteristic for a target angle of the displayed polygon based on the value denoting the characteristic set by the setting; and
      displaying the range of possible angle values determined for the target angle,
   wherein:
      the polygon is a triangle having a first side and a second side, wherein the first side is one of two sides forming the target angle and wherein the second side is an opposite side to the target angle; and
      the processor is configured such that, if the processor determines that the value is set for each of the first and second sides and that the value of the first side is equal to or larger than the value of the second side, the processor determines a maximum value of the range of possible angle values for the target angle based on a relationship between the value of the first side and the value of the second side.

3. A graphic display control method using an electronic device including a display screen, the method comprising:
   displaying a polygon on the display screen;
   setting a value denoting a characteristic for at least one of an angle and a side of the displayed polygon;
   determining a range of possible angle values as the value denoting the characteristic for a target angle of the displayed polygon based on the set value denoting the characteristic; and
   displaying the determined range of possible angle values for the target angle,
   wherein:
      the displaying comprises displaying a triangle as the polygon; and
      the determining comprises, if it is determined that two sides of the triangle are equal to each other in length, determining the range of possible angle values for the target angle based on the two sides being equal to each other in length.

4. A graphic display control method using an electronic device including a display screen, the method comprising:
   displaying a polygon on the display screen;
   setting a value denoting a characteristic for at least one of an angle and a side of the displayed polygon;
   determining a range of possible angle values as the value denoting the characteristic for a target angle of the displayed polygon based on the set value denoting the characteristic; and
   displaying the determined range of possible angle values for the target angle,
   wherein:
      the displaying comprises displaying a triangle as the polygon, wherein the triangle has a first side and a second side, wherein the first side is one of two sides forming the target angle and wherein the second side is an opposite side to the target angle; and
      the determining comprises, if it is determined that the value is set for each of the first and second sides and that the value of the first side is equal to or larger than the value of the second side, determining a maximum value of the range of possible angle values for the target angle based on a relationship between the value of the first side and the value of the second side.

5. A non-transitory computer readable storage medium having stored thereon instructions which, when executed by a device, cause the device to perform operations including:
   displaying a polygon on a display screen;
   setting a value denoting a characteristic for at least one of an angle and a side of the displayed polygon;
   determining a range of possible angle values as the value denoting the characteristic for a target angle of the displayed polygon based on the set value denoting the characteristic; and
   performing control to display the determined range of possible angle values for the target angle,
   wherein:
      the polygon is a triangle; and
      if it is determined that two sides of the triangle are equal to each other in length, the instructions cause the device to determine the range of possible angle values for the target angle based on the two sides being equal to each other in length.

6. A non-transitory computer readable storage medium having stored therein instructions which, when executed by a device, cause the device to perform operations including:
  displaying a polygon on a display screen;
  setting a value denoting a characteristic for at least one of an angle and a side of the displayed polygon;
  determining a range of possible angle values as the value denoting the characteristic for a target angle of the displayed polygon based on the set value denoting the characteristic; and
  performing control to display the determined range of possible angle values for the target angle,
  wherein:
    the polygon is a triangle having a first side and a second side, wherein the first side is one of two sides forming the target angle and wherein the second side is an opposite side to the target angle; and
    if it is determined that the value is set for each of the first and second sides and that the value of the first side is equal to or larger than the value of the second side, the instructions cause the device to determine a maximum value of the range of possible angle values for the target angle based on a relationship between the value of the first side and the value of the second side.

* * * * *

UNITED STATES PATENT AND TRADEMARK OFFICE
CERTIFICATE OF CORRECTION

PATENT NO. : 9,734,604 B2  Page 1 of 1
APPLICATION NO. : 15/004536
DATED : August 15, 2017
INVENTOR(S) : Kota Endo It is certified that error appears in the above-identified patent and that said Letters Patent is hereby corrected as shown below:

In the Claims

Column 11, Line 47 after "based" insert --on--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*